(12) United States Patent
Ichimaru

(10) Patent No.: US 6,668,430 B2
(45) Date of Patent: Dec. 30, 2003

(54) CLIP FOR ATTACHING A COVER MEMBER AND A STRUCTURE FOR ATTACHING THE SAME

(75) Inventor: Takahide Ichimaru, Sagamihara (JP)

(73) Assignee: Nifco Inc., Yokohama (JP)

( * ) Notice: Subject to any disclaimer, the term of this patent is extended or adjusted under 35 U.S.C. 154(b) by 0 days.

(21) Appl. No.: 10/101,773

(22) Filed: Mar. 21, 2002

(65) Prior Publication Data
US 2002/0138956 A1 Oct. 3, 2002

(30) Foreign Application Priority Data
Mar. 28, 2001 (JP) .................................. 2001-092467

(51) Int. Cl.[7] .................................................. B42F 1/00
(52) U.S. Cl. .......................... 24/457; 24/297; 24/628; 24/293; 296/210
(58) Field of Search .......................... 24/457, 455, 297, 24/628, 293, 304, 459–462, 545, 292; 296/210

(56) References Cited

U.S. PATENT DOCUMENTS

| | | | | |
|---|---|---|---|---|
| 4,881,315 A | * | 11/1989 | Powell et al. | 29/450 |
| 5,413,398 A | * | 5/1995 | Kim | 296/210 |
| 5,533,237 A | * | 7/1996 | Higgins | 24/289 |
| 5,575,527 A | * | 11/1996 | Pfister | 296/213 |
| 5,829,825 A | * | 11/1998 | Kim | 296/210 |
| 6,381,811 B2 | * | 5/2002 | Smith et al. | 24/289 |

FOREIGN PATENT DOCUMENTS

| | | |
|---|---|---|
| FR | 2 675 547 | 10/1992 |
| JP | 10-297387 | 11/1998 |
| JP | 11-165596 | * 6/1999 |
| JP | 2000-27824 | * 1/2000 |
| JP | 2000-289537 | * 10/2000 |
| JP | 2001-3908 | * 1/2001 |
| JP | 2001-30852 | 2/2001 |
| JP | 2001-88625 | 4/2001 |
| JP | 2001-315589 | * 11/2001 |

* cited by examiner

Primary Examiner—Anthony Knight
Assistant Examiner—André L. Jackson
(74) Attorney, Agent, or Firm—Kanesaka & Takeuchi

(57) ABSTRACT

In a clip for attaching a cover member of the invention, a base plate of the clip is bonded to and fixed at a bottom of a concave section formed in a vehicle. The base plate is provided with a holding section for holding a holder for attaching the cover. Also, plural pairs of elastic pieces elastically abutting against both side surfaces forming the concave section are provided at both sides of the base plate. Accordingly, the clip for attaching the cover member can be easily bonded to and fixed at a center of a width direction of the concave section.

11 Claims, 6 Drawing Sheets

CLIP FOR ATTACHING A COVER MEMBER AND A STRUCTURE FOR ATTACHING THE SAME

BACKGROUND OF THE INVENTION AND RELATED ART STATEMENT

The present invention relates to a clip for attaching a cover member to a concave section formed in a vehicle. The present invention also relates to an attaching structure of the clip for attaching the cover member, in which both end sections of the cover member elastically abut against both side surfaces forming the concave section.

As a conventional clip for attaching a cover member, there has been known a clip, in which a positioning piece having a distal end abutting against a side surface forming a concave section of a vehicle, for example, a main roof panel or a side roof panel, is provided on one side of a base plate section to be bonded and fixed at a bottom of the concave section.

In this clip for attaching the cover member, the distal end of the positioning section abuts against a predetermined side surface forming the concave section, so that the clip can be bonded and fixed at a predetermined position away from the side surface, that is, a predetermined position in a width direction of the concave section.

In the conventional clip for attaching the cover member, since the positioning piece is provided at one side of the base plate section, the clip can be bonded and fixed after being positioned at a predetermined position away from one side surface forming the concave section. However, the clip can not be bonded and fixed at a center in the width direction of the concave section (a center of the width direction in a top surface of the concave section, or a center of the width direction in an opening rim of the concave section). Namely, the width of the concave section is not uniform due to a variance in overlapping upon connecting an end rim section of the main roof panel with an end rim section of the side roof panel even if it is tried to maintain a constant width of the concave section. Therefore, although the clip for attaching the cover member is bonded and fixed at a bottom of the concave section relative to the one side surface forming the concave section, the clip for attaching the cover member can not be positioned exactly at the center of the concave section.

If the clip for attaching the cover member can not be bonded and fixed to the center of the concave section, in case both end sections of the cover member are elastically contacted with the main roof panel and the side roof panel, the cover member may not be securely engaged with and attached to the clip for attaching the cover member, or both end sections of the cover member may not contact the main roof panel and the side roof panel.

The present invention has been made in order to solve the aforementioned problems, and an object of the invention is to provide a clip for attaching a cover member, which can be easily bonded and fixed at the center of the width direction of the concave section.

Another object of the present invention is to provide an attaching structure of the clip for attaching the cover member, in which both end sections of the cover member can securely and elastically contact both side surfaces forming the concave section.

Further objects and advantages of the invention will be apparent from the following description of the invention.

SUMMARY OF THE INVENTION

To achieve the above objects, the present invention provides a clip for attaching a cover member comprising a base plate section to be bonded to and fixed at a bottom of a concave section, a holding section disposed at the base plate section and holding the cover member therein, and elastic pieces provided at both sides of the base plate section and elastically abutting against respective side surfaces of the concave section, which form the concave section and are opposed to each other.

Preferably, a plurality of elastic pieces may be provided respectively at both sides of the base plate section, and guide surfaces guided by the side surfaces of the concave section may be provided in the elastic pieces. Also, a pair of elastic pieces may be provided at both sides of the base plate section, and an elastic force of the elastic piece at one side of the base plate section may be different from that of the elastic piece at the other side thereof.

The present invention also provides an attaching structure of a clip for attaching a cover member to a concave section of a vehicle. The attaching structure of the invention comprises a base plate section to bond and fix a clip for attaching the cover member to a bottom of a concave section, a holding section disposed at the base plate section and holding the cover member therein, and at least two elastic pieces provided at both sides of the base plate section and elastically abutting against the respective side surfaces of the concave section, which are opposed to each other. In this structure, the clip for attaching the cover member is inserted into the concave section while the elastic pieces are elastically made in contact with both the side surfaces of the concave section, so that the base plate section is bonded to and fixed at the bottom of the concave section.

DETAILED DESCRIPTION OF PREFERRED EMBODIMENTS

Hereunder, embodiments of the invention will be explained with reference to the accompanying drawings.

Figure 1:
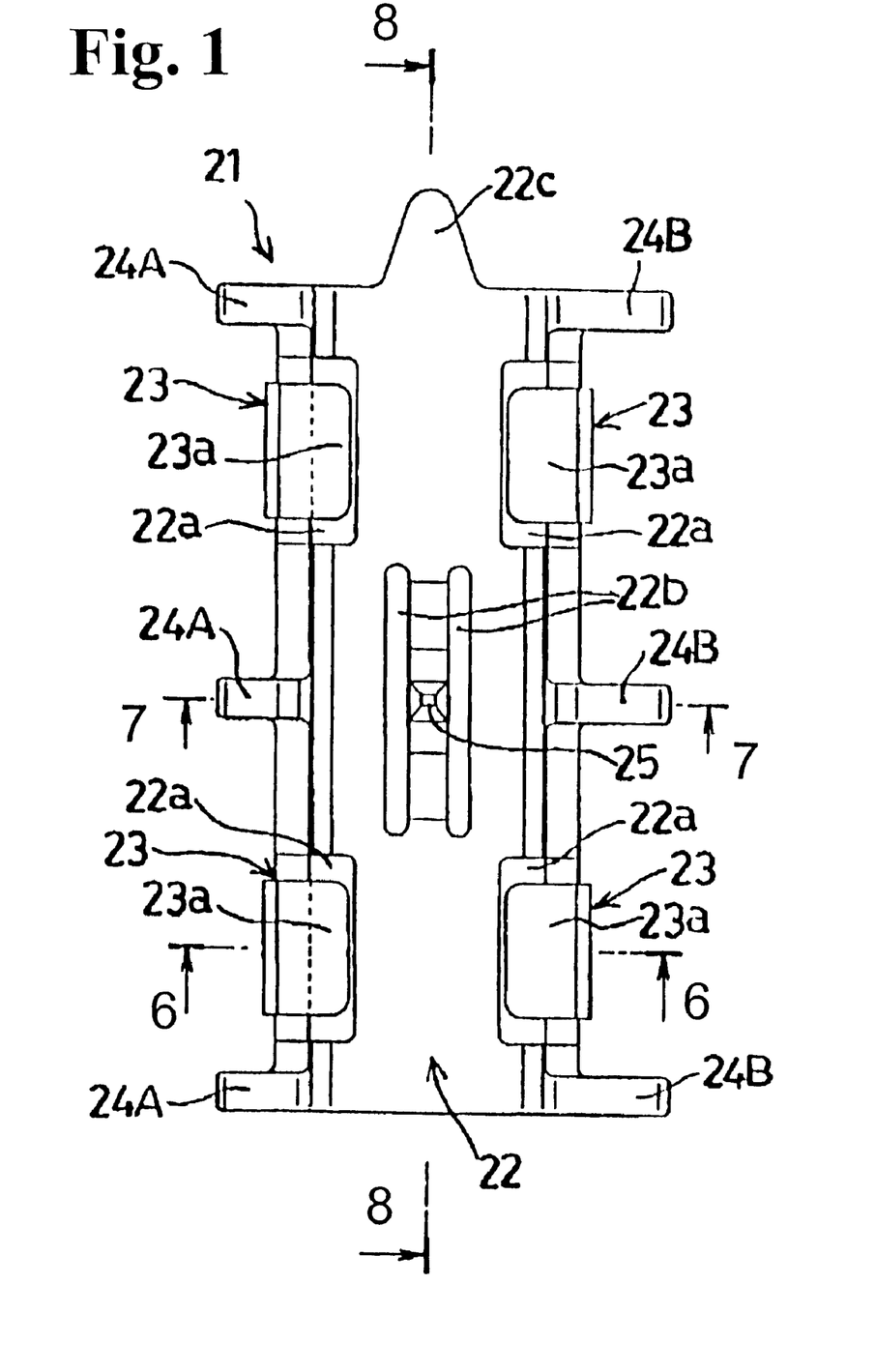
FIG. 1 is a top plan view of a clip for attaching a cover member according to an embodiment of the invention.

FIG. 1 is a top plan view of a clip for attaching a cover member according to an embodiment of the invention; FIG.

Figure 3:
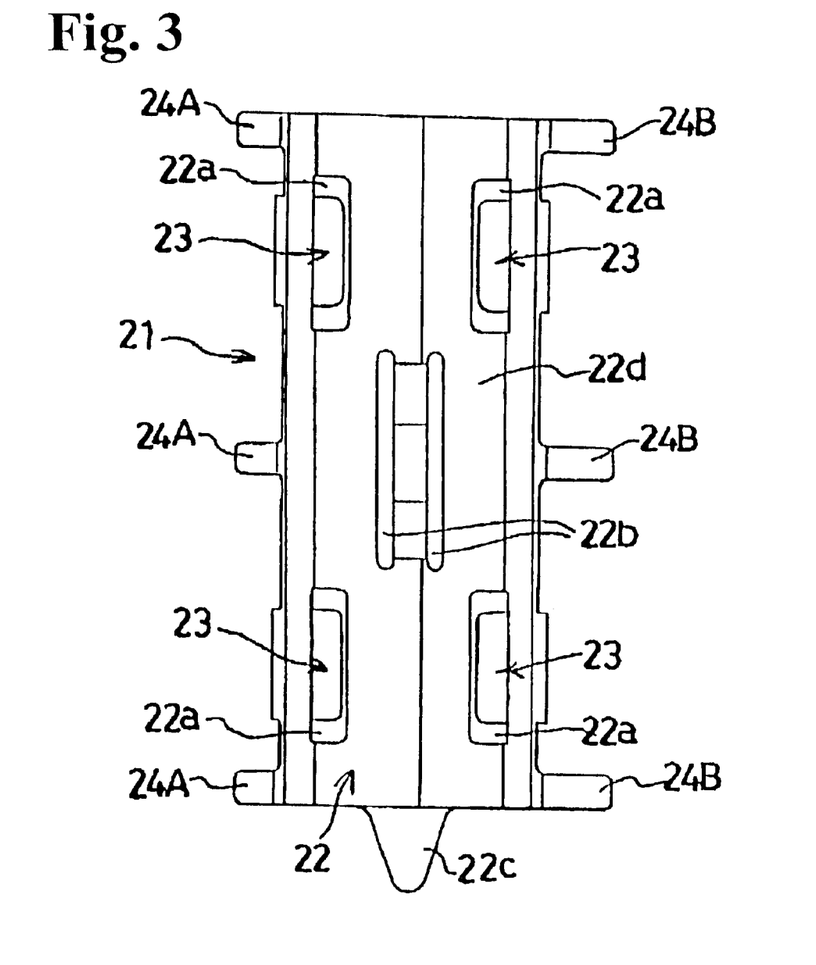
FIG. 3 is a bottom plan view of the clip for attaching the cover member shown in FIG. 1.
Figure 4:
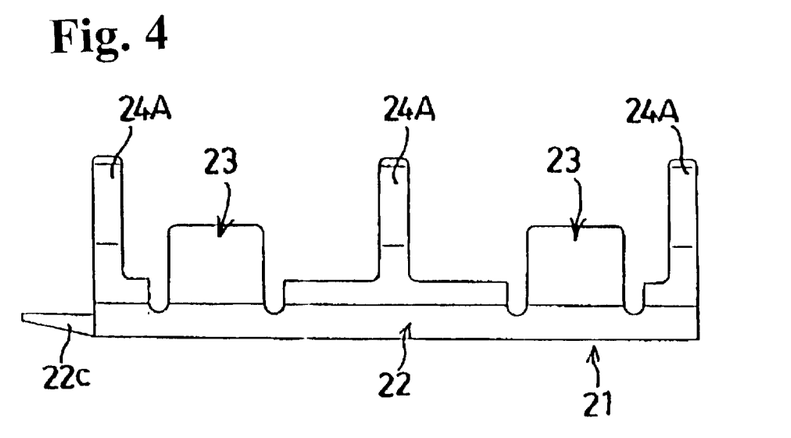
FIG. 4 is a left side view of the clip for attaching the cover member shown in FIG. 1.
Figure 5:
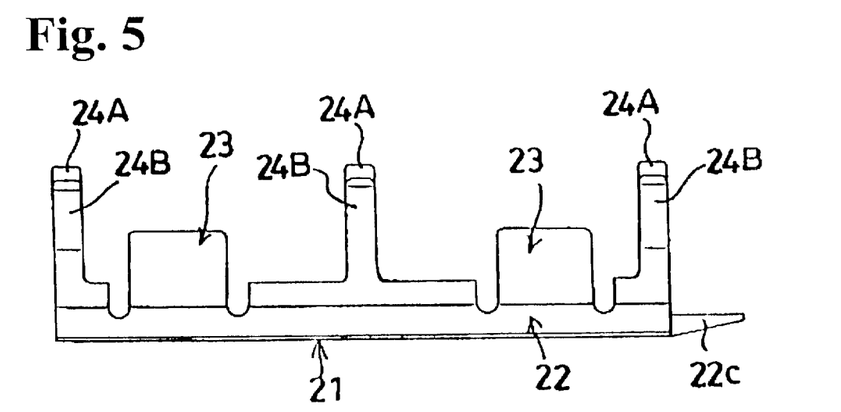
FIG. 5 is a right side view of the clip for attaching the cover member shown in FIG. 1.
Figure 6:
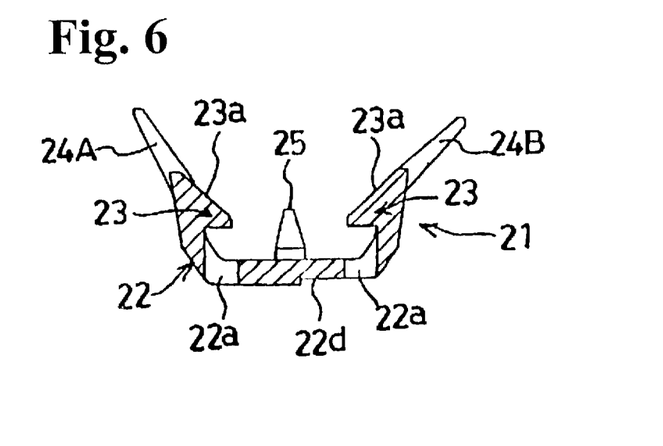
FIG. 6 is a cross sectional view taken along line 6—6 in FIG. 1.
Figure 7:
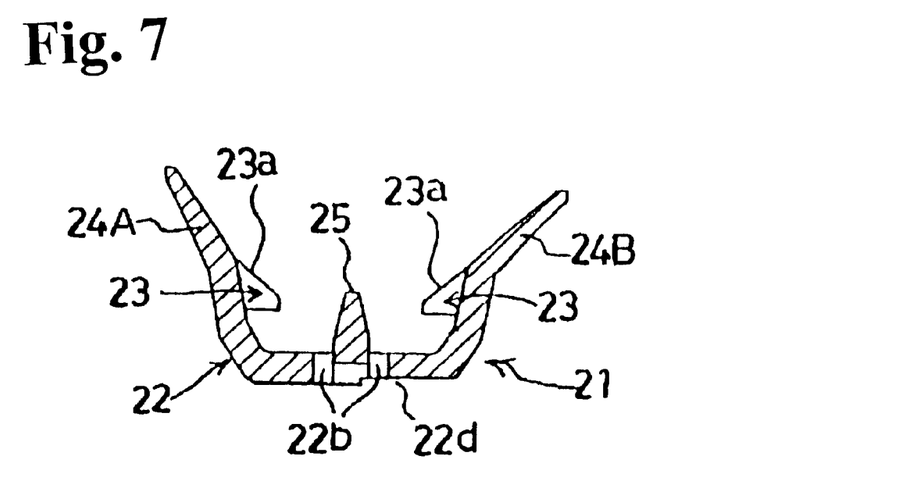
FIG. 7 is a cross sectional view taken along line 7—7 in FIG. 1.
Figure 8:
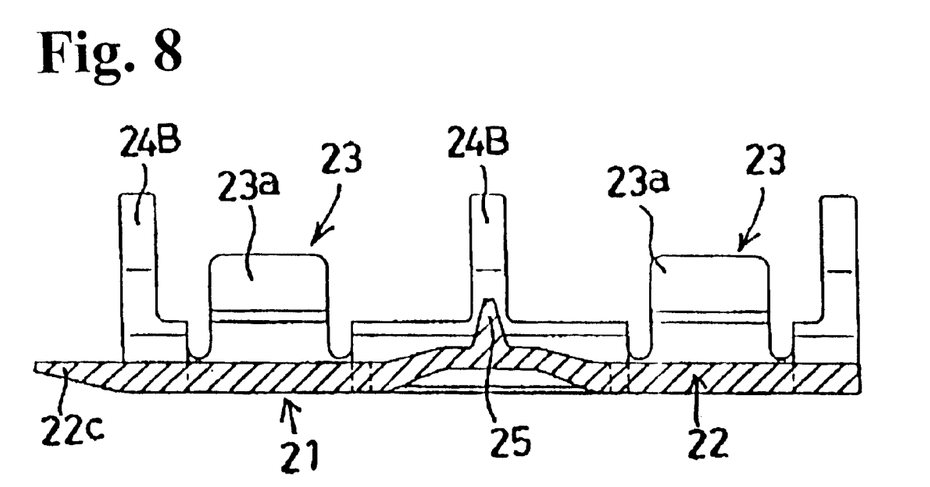
FIG. 8 is a cross sectional view taken along line 8—8 in FIG. 1.

2 is a front view of the clip for attaching the cover member shown in FIG. 1; FIG. 3 is a bottom plan view of the clip for attaching the cover member shown in FIG. 1; FIG. 4 is a left side view of the clip for attaching the cover member shown in FIG. 1; FIG. 5 is a right side view of the clip for attaching the cover member shown in FIG. 1; FIG. 6 is a cross sectional view taken along line 6—6 in FIG. 1; FIG. 7 is a cross sectional view taken along line 7—7 in FIG. 1; and FIG. 8 is a cross sectional view taken along line 8—8 in FIG. 1. Incidentally, a rear view of the clip for attaching the cover member is symmetrical to the front view thereof.

In these drawings, a clip 21 for attaching a cover member is made of a synthetic resin, and has a base plate section 22, which has a rectangular shape in a top plan view and a C-shape opened upwardly in a front (rear) view, i.e. bottom portion 22e and two side portions 22f; holding sections 23, which are integrally formed at slightly inner sides of both ends in a longitudinal direction (an up-down direction in FIG. 1 or a front to rear direction of a concave section 11 in FIG. 9 described later), and provided in a pair to face each other in a short side direction (a width direction, that is, right-left in FIG. 1), or a short side direction of the concave section (a right to left direction in FIG. 9); a plurality of elastic pieces 24A and 24B, which is integrally formed at both ends of the base plate 22 in the long side direction and at a center thereof, and is provided respectively in a pair to face each other in the short side direction, such that the elastic pieces 24A and 24B ascend as they extend toward the outside; and a positioning projection 25 integrally formed at a center of an upper surface of the base plate section 22.

Figure 2:
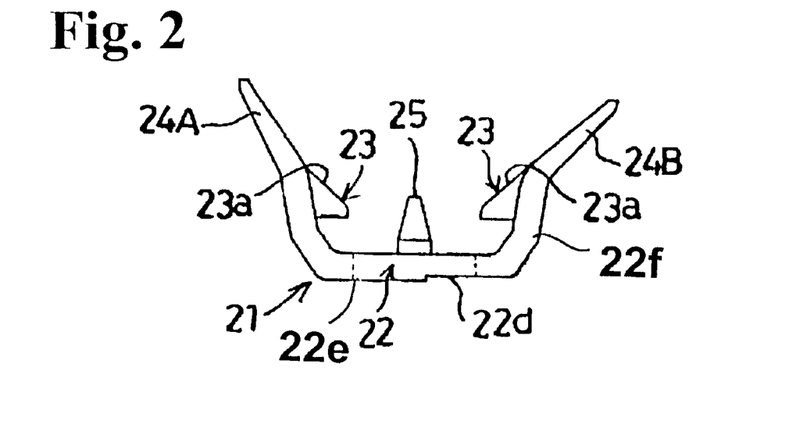
FIG. 2 is a front view of the clip for attaching the cover member shown in FIG. 1.

The base plate section 22 is provided with die cut holes 22a for pulling out a mold at a bottom opposed to the holding section 23; elongate holes 22b, which extend at both sides of the positioning projection 25 in a longitudinal direction to thereby enable the positioning projections 25 to move up and down or vertically; a mark projection 22c provided at a center in the short side direction at one of the longitudinal end (the upper end in FIG. 1) projecting in the longitudinal direction; a step portion 22d that is cut in the longitudinal direction for a predetermined width (a width shorter than a half of an entire width of the bottom) from one end (the right end in FIG. 2).

Also, each holding section 23 described above has an upper surface that constitutes an inclined surface (guide surface) 23a sloping down inwardly such that the inclined surface 23a guides a section 32 of a holder 31 for attaching the cover member, described later, toward a bottom side of the base plate section 22.

Each elastic piece 24A has an inclination angle different from that of each elastic piece 24B so that they provide different elastic forces. Also, the sides in the respective elastic pieces 24A and 24B facing the side surfaces (which include an opening rim) of the concave section 11 constitute guide surfaces (inclined surfaces) to be guided along the side surfaces of the concave section 11.

Figure 9:
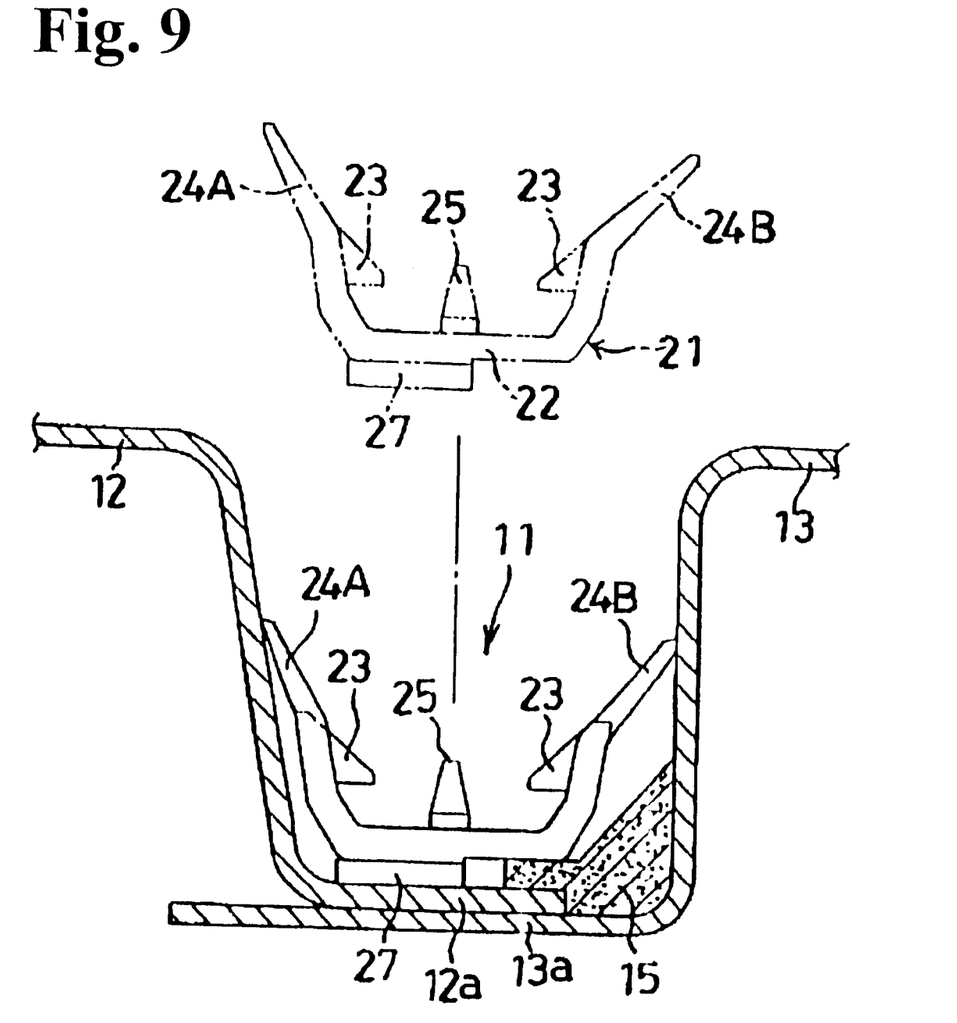
FIG. 9 is an explanatory view for explaining that the clip for attaching the cover member is attached to a concave section of a vehicle.
Figure 10:
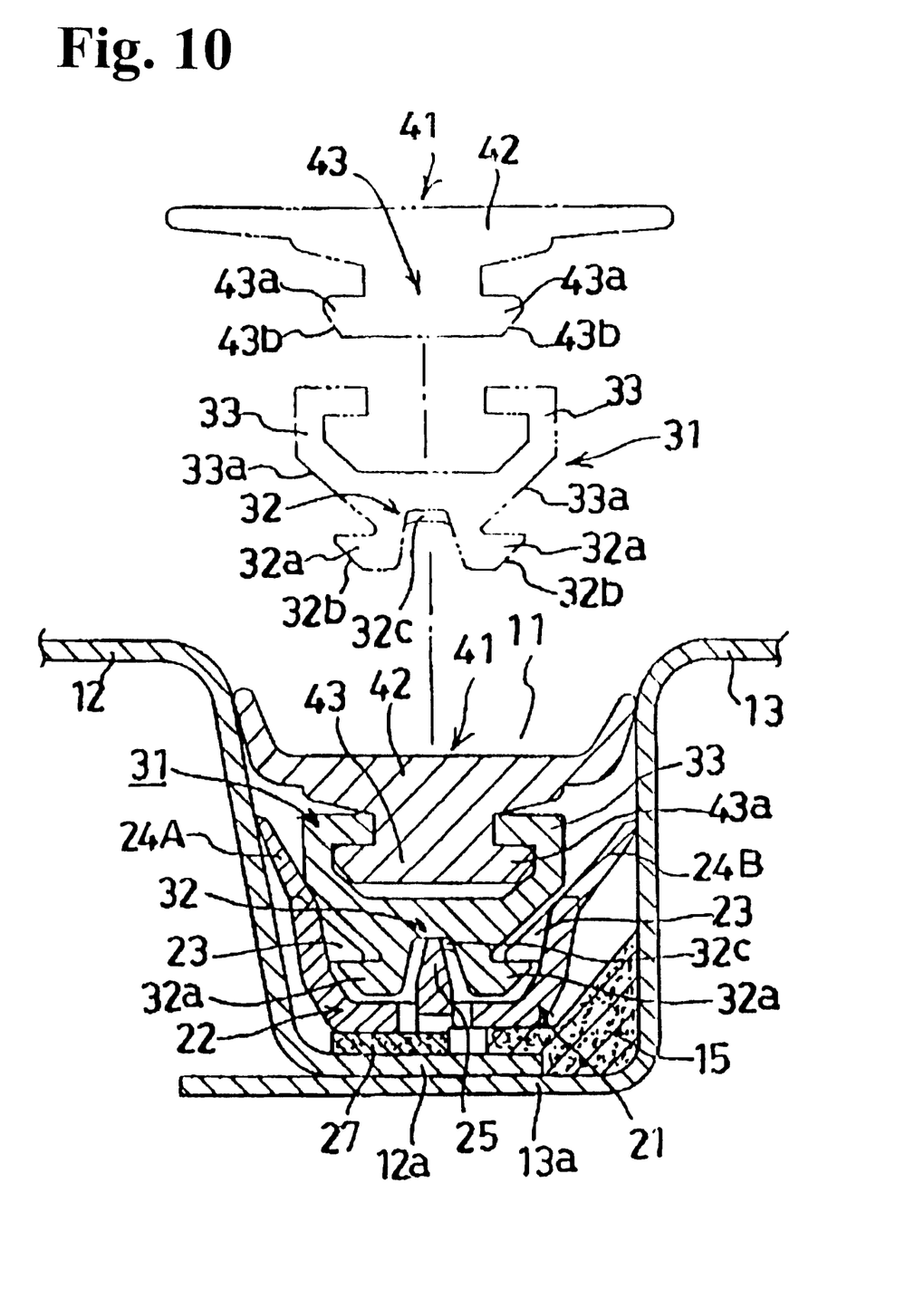
FIG. 10 is an explanatory view for explaining that a holder for attaching the cover member and the cover member are attached to the clip for attaching the cover member, which is attached to the concave section.

FIG. 9 is an explanatory view showing that the clip for attaching the cover member is attached to the concave section of the vehicle, and FIG. 10 is an explanatory view showing that the cover member and the holder for attaching the cover member are attached to the clip for attaching the cover member, which is attached to the concave section of the vehicle.

In these drawings, the concave section 11 to which the clip 21 for attaching the cover member is formed by welding an end rim portion 12a of a main roof panel 12 and an end rim portion 13a of a side roof panel 13. Both side surfaces of the concave section 11 are formed by the main roof panel 12 and the side roof panel 13, and have different inclination angles from each other.

A sealant 15 is provided for sealing a connecting portion between the end rim portion 12a of the main roof panel 12 and the end rim portion 13a of the side roof panel 13. A double-faced adhesive tape 27 as an adhesive is used for bonding the base plate section 22 of the clip for attaching the cover member to the bottom of the concave section 11 to thereby fix the base plate section 22 thereat.

The holder 31 for attaching the cover member, which is made of a synthetic resin, is formed of the section 32 to be held by the holding sections 23 of the clip 21 for attaching the cover member; and holding sections 33 provided at a center of the section 32 along a longitudinal direction for holding a section 43 of a cover member 31, described later.

The section 32 is provided with claw sections 32a at both lower sides thereof in a longitudinal direction; and a positioning concave section 32c at a bottom center thereof facing the positioning projection 25 of the clip 21 for attaching the cover member.

Then, in each claw section 32a, an end portion of a lower side in a longitudinal direction constitutes an inclined surface (guide surface) 32b expanding upwardly. Further, in each holding section 33, an end portion of a lower side in a longitudinal direction constitutes an inclined surface 33a, which expands upwardly and reaches the section 32.

The holder 31 for attaching the cover member has the same longitudinal length as that of the clip 21 for attaching the cover member. Incidentally, the holder 31 for attaching the cover member is formed symmetrically.

The cover member 41 for covering the concave section 11 is made of a synthetic resin, and formed of a cover member section 42 having both end rims elastically contacting the main roof panel 12 and the side roof panel 13, which form the concave section 11; and the section 43, which is provided at a center of a lower surface of the cover member section 42 in a longitudinal direction, to thereby be held by the holding sections 33 of the holder 31 for attaching the cover member.

In the section 43, both lower ends in a longitudinal direction thereof are provided with claw sections 43a. Both end sections of each claw section 43 in a longitudinal direction have inclined surfaces (guide surfaces) 43b expanding upwardly.

Incidentally, although the cover member 41 is elongated and formed symmetrically, the sections 43 may be provided at only necessary positions.

Next, an installation of the cover member 41 will be explained.

Firstly, an installation of the clip 21 for attaching the cover member is explained. One surface of the double-faced adhesive tape 27 is bonded to a bottom surface (different surface from the step portion 22d) that is one step lower than the bottom of the clip 21 for attaching the cover member.

Incidentally, the width of the double-faced adhesive tape 27 is the same as that of the bottom surface of the clip 21, to which the double-sided is bonded. Then, as shown by phantom lines in FIG. 9, the elastic pieces 24A are located to face the main roof panel 12, and the elastic pieces 24B are located to face the side roof panel 13.

Next, the base plate section 22 is positioned parallel to the bottom of the concave section 11, and the clip 21 for attaching the cover member is inserted into the concave section 11. The elastic pieces 24A elastically contact the main roof panel 12 while being guided by the guide surfaces, and the elastic pieces 24B elastically contact the side roof panel 13 while being guided by the guide surfaces, so that the clip 21 for attaching the cover member can be inserted into the concave section 11.

When the clip 21 for attaching the cover member is inserted into the concave section 11 as described above, the base plate section 22 is positioned at the center of the width direction of the concave section 11 since the elastic forces of the respective elastic piece 24A and 24B are adjusted to be different in correspondence with the inclination angles of the main roof panel 12 and the side roof panel 13. Therefore, as shown by solid lines in FIG. 9, the base plate section 22 can be positioned at the center of the width direction of the concave section 11 to thereby be bonded and fixed thereat.

Next, as shown by the phantom lines in FIG. 10, the positioning concave section 32c is positioned to correspond to the positioning projection 25, and the section 32 of the holder 31 for attaching the cover member is pressed into a space between the holding sections 23 of the clip 21 for attaching the cover member. Accordingly, the claw sections 32a are guided by the inclined surfaces 23a and 32b, and they pass over the holding sections 23 while expanding the holding sections 23. Also, the positioning projection 25 enters into the positioning concave section 32c to engage therewith and abuts against the bottom of the section 32.

When the claw sections 32a pass over the holding sections 23 as described above, the base plate section 22 is returned to an original state by its own elasticity so that the holding sections 23 engage the claw sections 32a. Accordingly, the clip 21 for attaching the cover member can hold the holder 31 for attaching the cover member.

At this time, since the positioning projection 25 enters into the positioning concave section 32c to engage therewith, the holder 31 for attaching the cover member is positioned so as not to move in a longitudinal direction of the clip 21 for attaching the cover member.

Next, when the cover member 41 is pressed while the section 43 is positioned to correspond to a space between the holding sections 33 as shown by the phantom lines in FIG. 10, the claw sections 43a are guided by the inclined surfaces 43b, and they pass over the holding sections 33 while expanding the holding sections 33.

When the claw sections 43a pass over the holding sections 33 as described above, the holding sections 33 are returned to an original state by their own elasticity to engage the claw sections 43a. Therefore, as shown by the solid lines in FIG. 10, the cover member 41 can be held at the holder 31 for attaching the cover member.

At this time, the both end rims of the cover member section 42 elastically contact the both side surfaces (the main roof panel 12 and the side roof panel 13) of the concave section 11, so that the cover member 41 covers the concave section 11, and at the same time, the concave section 11 is sealed.

As described above, according to the embodiment of the invention, since the elastic pieces 24A and 24B are provided at both sides of the base plate section 22 to correspond to the longitudinal direction of the concave section 11, by making the elastic pieces 24A and 24B elastically in contact with both the side surfaces of the concave section 11, the clip 21 for attaching the cover member can be easily bonded to and fixed at the center of the width direction of the concave section 11 along the longitudinal direction of the concave section 11.

Further, since a plurality of the elastic pieces 24A and 24B is provided at both sides of the base plate section 22, by making the elastic pieces 24A and 24B elastically in contact with both the side surfaces of the concave section 11, the clip 21 for attaching the cover member can be easily bonded to and fixed at the center of the width direction of the concave section 11 along the longitudinal direction of the concave section 11.

Also, since a pair of the elastic pieces 24A and 24B is provided at both sides of the base plate section 22, the clip 21 for attaching the cover member can be securely and easily bonded to and fixed at the center of the width direction of the concave section 11.

Further, since the elastic force of the elastic piece 24A is set to be different from that of the elastic piece 24B, even if both the side surfaces forming the concave section 11 are not symmetrical, by adjusting the elastic forces of the elastic pieces 24A and 24B in correspondence with angles of the side surfaces of the concave section 11, the clip 21 for attaching the cover member can be easily bonded to and fixed at the center of the width direction of the concave section 11.

Also, since the elastic pieces 24A and 24B have the side surfaces guided at the side surfaces of the concave section 11, when the guide surfaces are positioned to abut against the side surfaces of the concave section 11, the clip 21 for attaching the cover member can be smoothly inserted into the concave section 11.

Further, since the base plate section 22 is provided with the mark projection 22c, the clip 21 for attaching the cover member can be inserted into the concave section 11 at a right position, and can be bonded and fixed thereat.

Also, the positioning projection 25 is provided at the clip 21 for attaching the cover member 21, and the positioning concave section 32c with which the positioning projection 25 engages is provided at the holder 31 for attaching the cover member. Therefore, the holder 31 for attaching the cover member can be positioned and attached to the clip 21 for attaching the cover member without moving.

In the embodiment described above, it has been shown as an example that plural pairs of the elastic pieces 24A and 24B are provided at both sides of the base plate section 22. However, even if only one elastic piece 24A and only one elastic piece 24B, or not paired, are provided, the clip 21 for attaching the cover member can be positioned and fixed at the center of the width direction of the concave section 11.

Also, although it has been shown as an example that the different inclination angles are formed on the elastic pieces 24A and 24B in order to obtain different elastic forces thereof, the elastic piece 24A may have different wall thickness from that of the elastic piece 24B to thereby impart different elastic forces thereof.

Further, although it has been shown as an example that the elastic force of the elastic piece 24A is different from that of the elastic piece 24B, in case that both side surfaces of the concave section 11 are symmetrical, the elastic forces of the elastic pieces 24A and 24B may be set to be equal, so that the clip 21 for attaching the cover member can be positioned and fixed at the center of the width direction of the concave section 11.

Also, although it has been shown as an example that the cover member 41 is attached to the clip 21 for attaching the cover member by interposing the holder 31 for attaching the cover member therebetween, the cover member 41 may be directly attached to the clip 21 for attaching the cover member.

As described above, according to the clip for attaching the cover member of the invention, since the elastic pieces are provided at both sides of the base plate section, when the elastic pieces elastically contact both side surfaces of the concave section, the clip for attaching the cover member can be easily bonded to and fixed at the center of the width direction of the concave section along the longitudinal direction of the concave section.

Also, since a plurality of the elastic pieces is provided at both sides of the base plate section, when a plurality of elastic pieces elastically abuts against both side surfaces of the concave section, the clip for attaching the cover member can be easily boded to and fixed at the center of the width direction of the concave section along the longitudinal direction.

Further, since the elastic pieces are provided with the guide surfaces guided by the side surfaces of the concave section, when the guide surfaces abut against the side surfaces of the concave section, the clip for attaching the cover member can be smoothly inserted into the concave section.

Also, since the pairs of the elastic pieces are provided at both sides of the base plate section, the clip for attaching the cover member can be securely and easily bonded to and fixed at the center of the width direction of the concave section.

Also, since the elastic forces of the elastic pieces are different at one side and the other, even if both side surfaces forming the concave section are not symmetrical, by having different elastic forces of the elastic pieces in correspondence with the inclination of both the side surfaces, the clip for attaching the cover member can be easily bonded to and fixed at the center of the width direction of the concave section.

Further, according to the attaching structure of the clip for attaching the cover member of the invention, the clip for attaching the cover member is inserted into the concave section while the elastic pieces are elastically made in contact with both side surfaces, which are opposed to each other, of the concave section, and the base plate section is bonded to and fixed at the bottom of the concave section. Therefore, the clip for attaching the cover member can be easily bonded to and fixed at the center of the width direction of the concave section.

While the invention has been explained with reference to the specific embodiments of the invention, the explanation is illustrative and the invention is limited only by the appended claims.

What is claimed is:

1. A clip for attaching a cover member to a concave section, comprising:
    a base plate member to be bonded to and fixed at a bottom of the concave section, and having two opposing sides,
    a holding section attached to the base plate member for engaging and holding the cover member said holding section includes at least two pairs of holding members facing each other and located between at least two pairs of elastic pieces, said
    at least two pairs of elastic pieces formed at longitudinal end portions of the base plate member, each pair being arranged to face each other at the two opposing sides of the base plate member and elastically abutting against side surfaces of the concave section to properly position the clip in the concave section.

2. A clip for attaching a cover member according to claim 1, wherein at least one pair of holding sections is located at the two opposing sides between the at least two pairs of the elastic pieces, each holding section having an inclined surface extending inwardly and downwardly toward a center of the base plate member and each elastic piece having an upper surface extending upwardly and outwardly from the base plate member so that the upper surface of the elastic piece continues to the inclined surface when viewed from a side of the clip.

3. A clip for attaching a cover member according to claim 1, wherein one of the elastic pieces at one side of the base plate member has an elastic force different from that of the other of the elastic pieces at the other side of the base plate member.

4. A clip for attaching a cover member according to claim 1, wherein each of said elastic pieces includes a guide surface to be guided by the side surfaces of the concave section.

5. A clip for attaching a cover member according to claim 4, wherein said base plate member has a bottom portion and two side portions extending upwardly from the bottom portion, said elastic pieces being formed at the side portions to extend laterally and upwardly so that rear surfaces of the elastic pieces extending laterally upwardly constitute the guide surfaces contacting the side surfaces of the concave section.

6. A clip for attaching a cover member according to claim 5, wherein said elastic pieces are attached to the respective side portions with angles different from each other to thereby change the elastic forces of the elastic pieces.

7. A clip for attaching a cover member according to claim 5, wherein said elastic pieces formed on the two opposing sides have thicknesses different from each other to thereby change the elastic forces of the elastic pieces.

8. A clip for attaching a cover member according to claim 1, further comprising a position projection projecting upwardly from the bottom portion to engage the cover member.

9. A clip for attaching a cover member according to claim 8, wherein said base plate member includes elongated holes at two lateral sides of the position projection to allow the position projection to move vertically relative to the base plate member.

10. An attaching structure, comprising:
    an elongated concave section with two side walls and a bottom between the two side walls,
    a cover member for covering the concave section, and
    a clip for attaching the cover member to the concave section, said clip having a base plate member fixed to a part of the bottom of the concave section and having two opposing sides, two holding sections disposed at the two opposing sides of the base plate member to face each other and extending inwardly to a center of the base plate member for engaging and holding the cover member therebetween, and at least two pairs of elastic pieces provided at longitudinal end portions of the two opposing sides of the base plate member, each elastic piece extending laterally outwardly from the base plate member and projecting upwardly beyond the holding section, said clip being inserted into the concave section while the two pairs of the elastic pieces elastically abut against the sidewalls of the concave section to thereby position and guide the clip to the bottom.

11. An attaching structure according to claim 10, wherein said clip further includes a position projection projecting upwardly from the bottom portion to immovably engage the cover member.

* * * * *